Patented July 25, 1939

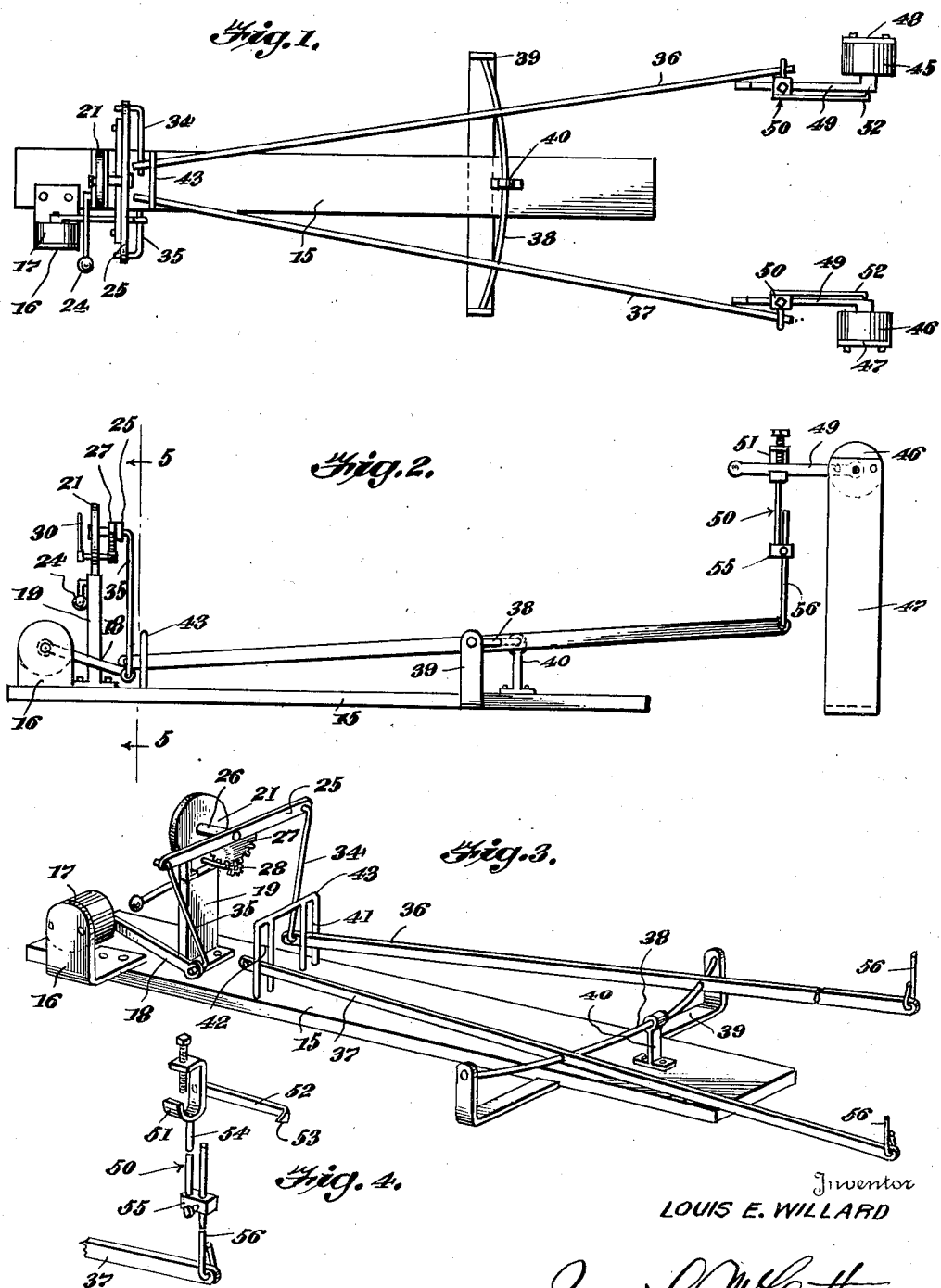
July 25, 1939.　　　L. E. WILLARD　　　2,167,429
TESTING MACHINE FOR SHOCK ABSORBERS AND THE LIKE
Filed Aug. 14, 1937　　　2 Sheets-Sheet 1
Inventor
LOUIS E. WILLARD

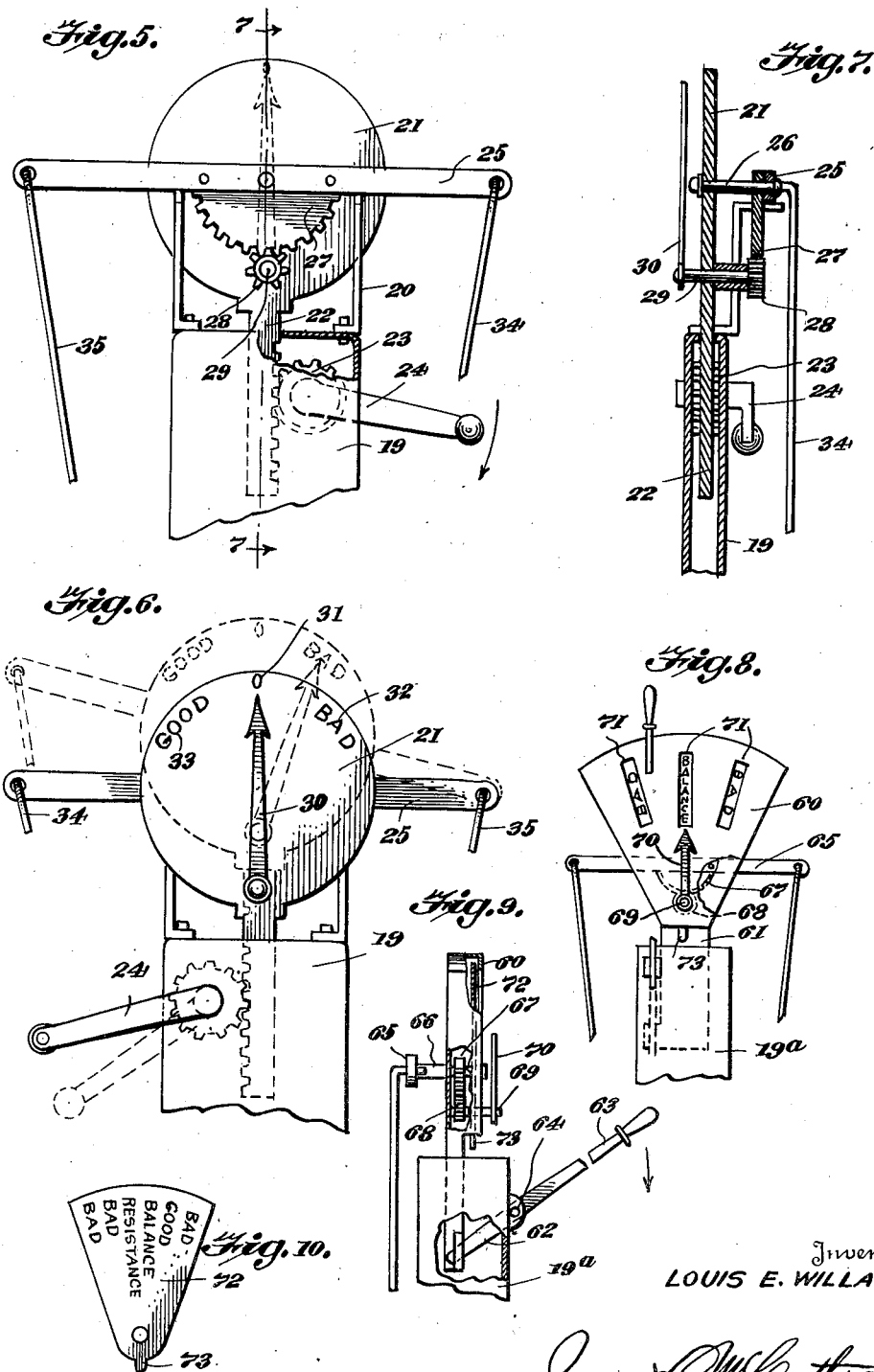

2,167,429

UNITED STATES PATENT OFFICE 2,167,429

TESTING MACHINE FOR SHOCK ABSORBERS AND THE LIKE

Louis E. Willard, Dallas, Tex., assignor of fifty-one per cent to John M. Hanford, Dallas, Tex.

Application August 14, 1937, Serial No. 159,171

12 Claims. (Cl. 73—51)

This invention relates to testing machines for shock absorbers and the like, and has for one of its objects the production of a simple and efficient testing machine which embodies a plurality of beam arms which are adapted to be connected to the shock absorbers to be tested whereby action of the shock absorbers to be tested may be compared through the medium of lifting the testing beams.

Another object of this invention is the production of a simple and efficient apparatus which is so constructed as to facilitate the testing of shock absorbers of an automobile and the like without the necessity of removing the shock absorbers from the chassis.

A still further object of this invention is the production of a simple and efficient means for facilitating the testing of shock absorbers and also facilitating the comparison of a pair of the shock absorbers with respect to each other.

The present invention constitutes an improvement upon my present invention relating to Testing machine for shock absorbers and the like, and protected by Patent #2,101,228, issued December 7, 1937.

Other objects and advantages of the present invention will appear throughout the following specification and claims.

In the drawings:—

Figure 1 is a top plan view of the testing machine;

Figure 2 is a side elevation thereof;

Figure 3 is a perspective view of the testing machine certain parts being broken away;

Figure 4 is a perspective view of the connecting means for the shock absorber arm and beam arm;

Figure 5 is an enlarged front elevation of the testing meter, certain parts being shown in section;

Figure 6 is an enlarged rear elevation of the testing meter;

Figure 7 is a vertical sectional view taken on line 7—7 of Figure 5;

Figure 8 is a rear elevation of a modified form of testing meter;

Figure 9 is a side elevation of the structure shown in Figure 8;

Figure 10 is an elevation of an indicator plate used in conjunction with the structure shown in Figures 8 and 9.

By referring to the drawings, it will be seen that 15 designates the base of the machine, which carries near its one end an upstanding bracket 16 which is adapted to support the standard testing shock absorber 17, which shock absorber 17 is provided with a crank arm 18.

An upright housing 19 is secured to the base 15 slightly in advance of the bracket 16, as shown in detail in Figure 3, and this upright housing 19 carries a pair of spaced supporting arms 20 which extend upwardly of the housing 19, as shown in detail in Figure 5. A testing meter 21 extends above the housing 19 and preferably comprises a circular disc-like member having a depending rack bar 22 extending from the bottom thereof and into the housing 19 as shown in Figure 5. This rack bar 22 is engaged by a pinion 23 carried by the crank arm 24, which pinion 23 meshes with the rack bar 22, as shown in Figure 5, the crank arm 24 being suitably journaled upon the housing 19. As the crank arm 24 is swung, the rotation of the pinion 23 will raise and lower the rack bar 22 as well as the testing meter 21 depending upon the direction in which the crank arm 24 is swung.

A balance arm 25 is journaled upon a shaft 26, which shaft 26 is journaled also upon the testing meter 21 so as to allow the balance arm 25 to swing upwardly or downwardly. A segmental rack 27 is fixed to the balance arm 25 and meshes with a pinion 28 carried by a shaft 29, which shaft 29 extends through the testing meter 21 and carries an indicating hand 30, which indicating hand 30 extends upwardly and preferably is in the form of an arrow normally pointing to a zero mark 31 formed upon the rear face of the testing meter 21. This is clearly shown in Figure 6. To the right of the zero mark 31 is printed the word "Bad" indicated by the numeral 32 as shown in Figure 6, and to the left is printed the word "Good" as indicated by the numeral 33 in Figure 6, thereby allowing the testing mechanic to determine at a glance whether or not the shock absorbers being tested are good or bad, depending upon the position of the hand 30 as will be obvious by considering Figure 6. Normally the balance arm 25 rests upon the upper ends of the supporting arms 20, but as the testing meter 21 is raised by a pulling of the crank 24 downwardly, in the direction of the arrow shown in Figure 5, the balance arm 25 will be raised.

The balance arm 25 carries at one end a pitman rod or link 34, and at its other end a pitman rod or link 35, having suitable oppositely extending end portions for connecting with the crank arm 18 or the beam arms 36 and 37. The beam arms 36 and 37 preferably are mounted upon the bowed supporting bar 38 which is carried by the frame 39 and braced at its center by an upstanding support 40. These beam arms 36 and 37 may be adjusted upon the length of the arched supporting bar 38 to accommodate the beams to a proper position depending upon the particular type of automobile upon which the device is operating. The inner ends of the beam arms 36 and 37 pass through the guiding slots 41 and 42 respectively, of the guiding frame 43 located near the housing 19, as shown in detail in Figure 3.

As shown in Figures 1 and 2, the numerals 45 and 46 indicate conventional shock absorbers which are supported upon conventional supporting brackets 47 and 48, respectively, which brackets are carried in a conventional manner by the chassis of an automobile. Each shock absorber 45 and 46 is provided with an arm 49 and each arm 49 is adapted to be connected to one of the beam arms by a suitable adjustable connection 50.

It should be noted that the supporting bar 38 is bowed outwardly away from the guiding frame 43, or in other words, is struck on the arc from the center of the guiding frame 43 so as to allow the beams to spread and keep the true pivot point in the lateral spread of the arms at the center of the guiding frame 43, the bar 38 as stated being struck on the arc of a circle with its center at the center of the frame 43.

This adjustable connection 50 is shown in detail in Figure 4 and comprises a clamp 51 for clamping engagement with the shock absorber arm 49, and this clamp carries an index finger 52 which is of the same length as the arm 18 and terminates in a pointer 53 adapted to register with the center of the shock absorber, as shown in Figure 1, and thus cause the clamp 51 to be disposed at a point upon the length of the arm 49 of the shock absorber a distance corresponding to the length of the arm 18 and provide for a proper leverage. In this way, the adjustable connections 50 of the respective beam arms and shock absorber arms may be equally spaced upon the respective shock absorber arms. The clamp 51 carries a depending rod 54 which is secured to an adjustable clamp 55, which adjustable clamp 55 is adjustable upon a link 56, which link 56 may be secured to the outer end of one of the beam arms. The adjustable connection 50 is similar in each instance and it is thought necessary to only describe the connection of one of these adjustable connections, it being understood that a direct adjustable connection is used for the connection of the outer ends of the beam arms 36 and 37 with the shock absorber arm 49 of shock absorbers 45 and 46.

In Figures 8, 9 and 10, there is shown a different type of testing meter, wherein an upright housing 19a is illustrated which is adapted to be supported upon a base similar to the base 15 and a testing meter 60 is mounted upon the housing 19 in a manner to be vertically slidable thereon, the meter 60 having a reduced shank portion 61 which is engageable by the inner end 62 of a lever 63, which lever 63 is pivotally mounted, as at 64, upon the housing 19a. By swinging the lever 63 downwardly in the direction of the arrow shown in Figure 9, the shank portion 61 may be slid upwardly thereby bodily raising the meter 60.

A balance arm 65 is journaled upon a shaft 66, which shaft 66 is in turn journaled upon the meter 60 and carries a segmental rack 67 which segmental rack 67 meshes with a pinion 68 carried by a shaft 69 which shaft 69 extends through the opposite side of the meter 60 and carries an indicating hand 70 pointing upwardly. The meter 60 is provided with a plurality of radiating slots 71 in one face thereof and an indicating plate 72 is mounted within the casing 60 whereby the indicating words "Bad", "Good", "Balance", "Resistance", "Bad", "Bad", may be brought to register with the slots 71 to be viewed at proper times either in testing for resistance or testing for balance. The indicating plate 72 is journaled upon the shaft 69 and is provided with a depending lug 73 projecting below the meter 60 so that an operator may swing the plate 72 from one side to the other and cause a desired set of companion words to be displayed through the slots 71. When a test for balance is to be made, the plate is swung to a position in which the word "Balance" will be displayed through the center slot and companion words "Good" and "Bad" displayed through the other slots. If the shock absorbers are balanced the hand points to the word "Balance" but if they are out of balance the hand will be shifted towards one of the side slots through which is displayed the word "Bad". When a resistance test is to be made the plate will be shifted to a position in which the word "Resistance" is displayed through the center slot and companion words "Good" and "Bad" displayed through the side slots. Movement of the hand towards a side slot will then indicate whether the resistance is good or bad, according to the direction in which the hand moves.

From the foregoing description, it will be seen that a very simple and efficient means has been provided whereby one beam arm may be hooked at one end to the arm of the shock absorber to be tested and hooked at the other end to one end of the balance arm, the opposite end of the balance arm being connected to a standard testing shock absorber and the two shock absorbers 17 dynamically compared by lifting the balance arm bodily and reading the position of the indicating hand with respect to the meter. The balance arm 25 may be connected to the inner end of either of the beams 36 and 37 for testing as to resistance and by noting the position of the hand 30, the operator may easily determine whether the resistance of the shock absorber being tested is good or bad. Then when it is desired to compare the two shock absorbers, such for instance as the shock absorbers 45 and 46, the pitman rods or links 34 and 35 may be connected respectively to the inner ends of the beams 36 and 37 and by lifting the meter 21, the position of the hand 30 will indicate whether or not the two shock absorbers 45 and 46 are properly balanced and will also indicate by the position of the hand 30 whether variance is in the right or left-hand shock absorber. The leverage remains the same when the link 34 is connected with either the bear 36 or 37 because when the beams are spread apart as shown in Figure 3, the end of each will swing into the same angular position relative to the link 34.

In the form shown in Figures 1 to 6, the lifting is accomplished by swinging the crank arm 24 downwardly in the direction of the arrow, whereas the lifting as shown in the types illustrated in Figures 8 and 9 is accomplished by swinging the lever 63 downwardly.

It is a well-known fact that shock absorbers on automobiles and other vehicles must have not only a proper resistance but they must also be dynamically balanced in pairs. The present invention facilitates the double reading both as to resistance and balance and also facilitates the testing of the various shock absorbers. Shock absorbers are mounted at various positions on different type cars and the present device has been designed to be adaptable for use upon these various types of cars and for this reason there have been provided the elongated beam arms 36 and 37 which are mounted in spreading relation upon their supports. These arms may be of any suitable or desired length and may be replaced for longer or shorter arms as occasion may require. The shock absorbers used upon various equipment are provided with arms varying in lengths and for this reason I provide the particular index finger 52 upon the adjustable connection between the arm 49 and the beam arms 36 and 37. The indicating means have very simple construction both in the form shown in Figures 1 to 6 inclusive, and also that as shown in Figures 8 and 9 to simplify the reading and to allow the operator at a glance to obtain a proper reading without difficult calculation or minute inspection.

It is obvious that the present machine will provide two different tests since the pitman rod 35 may be hooked into engagement with the known standard shock absorber 17 used for makng the test, and then either one of the shock obsorbers 45 or 46 on the car may be tested by simply attaching the pitman rod 34 to either of the beam arms 36 or 37. I may then compare the known standard shock absorber 17 with the selected shock absorber 45 or 46, and when the meter 21 is lifted, the desired reading is obtained. The pitman rod 34 may then be shifted to the other beam for testing the other shock absorber in the pair, and a proper reading obtained by a simple operation.

Then again, the link 34 may be connected to the beam 36 and the link 35 connected to the beam 37, and by lifting the meter 21 a balance reading may be obtained by observing the position of the hand 30 which will indicate whether or not the right-hand or the left-hand shock absorber is high or low. It is important to remember that the present device gives a simplified reading of the resistance test, as well as a simplified reading of the balance arm.

Having described the invention, what I claim as new is:

1. A testing machine for shock absorbers and the like, comprising a testing meter, a balance arm mounted for swinging movement upon the testing meter, an indicator actuated by said balance arm, means for detachably connecting one end of said balance arm to a standard testing shock absorber, a beam arm adapted to be connected at one end to a shock absorber to be tested, means for detachably connecting the opposite end of said balance arm to the opposite end of said beam, and means for manually lifting the testing meter whereby the resistance of the shock absorber which is being tested may be readily determined.

2. A testing machine for shock absorbers and the like, comprising a support, a testing meter supported upon said support, a balance arm carried by the testing meter, an indicator actuated by the balance arm, a plurality of beam arms, means for detachably connecting the outer ends of the beam arms to selected shock absorbers to be tested, means for attaching the inner ends of said beam arms to the opposite ends of said balance arm, and means for bodily lifting the meter and balance arm for dynamic comparison of the shock absorbers which are being tested.

3. A testing machine of the class described comprising a support, a meter carried by the support, a balance arm journaled upon said meter, an indicating hand carried by the meter, means connecting the indicator hand to the balance arm whereby the indicator hand will be swung as said balance arm is swung, means for connecting one end of said balance arm to the arm of a standard testing shock absorber, means at the opposite end of said balance arm for connecting the same to a shock absorber which is being tested, and means for bodily raising the meter and balance arm for determining the relative resistance between the shock absorber being tested and the standard testing shock absorber.

4. A testing machine of the class described comprising a support, a meter carried by said support, a balance arm journaled upon said meter, an indicator carried by said meter and actuated by said balance arm, means for bodily lifting the meter, and detachable means connected to the respective ends of said balance arm whereby said detachable means may be selectively connected with a testing shock absorber, a shock absorber to be tested, and the like.

5. A testing machine of the class described comprising a support, a meter carried by said support, a balance arm journaled upon said meter, an indicator carried by said meter and actuated by said balance arm, radiating beam arms extending away from said meter, means for detachably connecting the outer ends of said beam arms to shock absorbers to be tested, detachable means for selectively connecting the balance arm with the beam arms and the standard testing shock absorber, and means for bodily lifting said meter and balance arm for testing purposes.

6. A testing machine of the class described comprising a support, a meter carried by said support, a balance arm journaled upon said meter, an indicator carried by said meter and actuated by said balance arm, radiating beam arms extending away from said meter, means for detachably connecting the outer ends of said beam arms to shock absorbers to be tested detachable means for selectively connecting the balance arm with the beam arms, means for bodily lifting said meter and balance arm for testing purposes, said balance arm having a segmental rack, an indicator hand carried by said meter, and a pinion supported in conjunction with said indicator hand and meshing with said segmental rack for swinging said indicator hand as said balance arm is swung.

7. A testing machine of the class described comprising a support, a meter carried by said support, a balance arm journaled upon said meter, an indicator carried by said meter and actuated by said balance arm, radiating beam arms extending away from said meter, means for detachably connecting the outer ends of said beam arms to shock absorbers to be tested, detachable means for selectively connecting the balance arm with the beam arms said meter having a depending rack bar, a crank arm carried by said support, and a pinion operable by said crank arm and meshing with said rack bar for raising said meter as said crank arm is swung in one direction.

8. A testing machine of the class described comprising a support, a meter carried by said support, a balance arm journaled upon said meter, an indicator carried by said meter and actuated by said balance arm, radiating beam arms extending away from said meter, means for detachably connecting the outer ends of said beam arms to shock absorbers to be tested, detachable means for selectively connecting the balance arm with the beam arms said meter having a depending rack bar, a crank arm carried by said support, a pinion operable by said crank arm and meshing with said rack bar for raising said meter as said crank arm is swung in one direction, and upstanding supporting arms carried by said support upon which arms said balance arm is adapted to normally rest.

9. A testing machine of the class described comprising a support, a meter carried by said support, a balance arm journaled upon said meter, an indicator carried by said meter and actuated by said balance arm, radiating beam arms extending away from said meter, means for detachably connecting the outer ends of said beam arms to shock absorbers to be tested, detachable means for selectively connecting the balance arm with the beam arms, means for bodily lifting said meter and balance arm for testing purposes, and upright guiding means for the inner ends of said beam arms.

10. A testing machine of the class described comprising a support, a meter carried by said support, a balance arm journaled upon said meter, an indicator carried by said meter and actuated by said balance arm, radiating beam arms extending away from said meter, means for detachably connecting the outer ends of said beam arms to shock absorbers to be tested, detachable means for selectively connecting the balance arm with the beam arms means for bodily lifting said meter and balance arm for testing purposes, an arch-like bearing rod pivotally supporting said beam arms, said beam arms being laterally adjusted with respect to each other upon said arch-like bearing rod.

11. A testing machine of the class described comprising a support, a meter carried by said support, a balance arm journaled upon said meter, an indicator carried by said meter and actuated by said balance arm, radiating beam arms extending away from said meter, detachable means for connecting the outer ends of the beam arms with shock absorbers to be tested, means for bodily lifting said meter and balance arm for testing purposes, said detachable means each comprising a clamp adapted to engage the arm of a shock absorber to be tested, slidable adjustable rods carried by the clamp for engagement with the outer end of a beam arm, and an index arm carried by the clamp for properly setting the position of the clamp upon the arm of a shock absorber which is being tested.

12. A testing machine of the class described comprising a support, a meter rising from said support, a balance arm mounted for swinging movement upon said meter, an indicator hand for said meter operable by said balance arm, means for connecting the balance arm at its ends to a shock absorber testing mechanism, said meter being mounted for vertical shifting movement upon said support, a lever engaging the meter for lifting the meter as the lever is swung vertically, the meter having sight openings, an indicator plate mounted within the meter and having indicia formed thereon to be moved into registration with the openings, and means for swinging said indicator plate to selective positions to bring the indicia into selective registration with the openings to facilitate the reading of the meter while the same is being used for resistance testing as well as for balance testing.

LOUIS E. WILLARD.